Jan. 3, 1956  C. M. CHERRIER  2,729,097
APPARATUS FOR ANALYZING GASES
Filed Jan. 3, 1952  2 Sheets—Sheet 1

INVENTOR
CLAUDE-MICHEL CHERRIER
BY
Dale A. Bauer
ATTORNEY

United States Patent Office 2,729,097
Patented Jan. 3, 1956

2,729,097

APPARATUS FOR ANALYZING GASES

Claude M. Cherrier, Saint-Mande, France, assignor to Societe Anonyme des Manufactures des Glaces et Produits Chimiques de Saint-Gobain, Chauny & Cirey, Paris, France Application January 3, 1952, Serial No. 264,799

6 Claims. (Cl. 73—27)

This invention relates to improvements in magnetic analysis of paramagnetic gases such as oxygen and nitrogen oxides. Inasmuch as the same principles apply to all paramagnetic gases, the invention will be described in particular relation to the determination of the percentage of oxygen in a mixed gas, it being understood that the invention is equally applicable to all gases having the same properties.

It has been suggested to take advantage of the paramagnetism of oxygen, and of other paramagnetic gases, to determine the percentage of those gases in a gaseous mixture, or to determine the presence of such gases in such mixtures. The basis of the method is somewhat as follows:

The gaseous current in which it is wished to determine the presence and the amount of oxygen is permitted to circulate within the effective range of a magnetic field. A part of the oxygen contained in the mixture is attracted by this field, and a current of oxygen is set up which is utilized by various devices to cool one filament that is electrically heated and to heat another. The measurement of the gas content is related to the comparison of the temperatures of the two filaments, and that is made in practice by comparing their electrical resistance by means of a Wheatstone bridge.

At the present time the apparatus which have been constructed to put these principles in operation are of poor sensitivity and of low stability. It is an object of the present invention to overcome the imperfections of the apparatus of the prior art, to improve the process of determining the percentage of a paramagnetic gas in mixed gases.

The invention concerns the electrical design for the measurement of resistances and apparatus in which the gas is diverted by the action of the magnetic field and unbalances the thermal equilibrium of electrical resistances.

Figure 1:
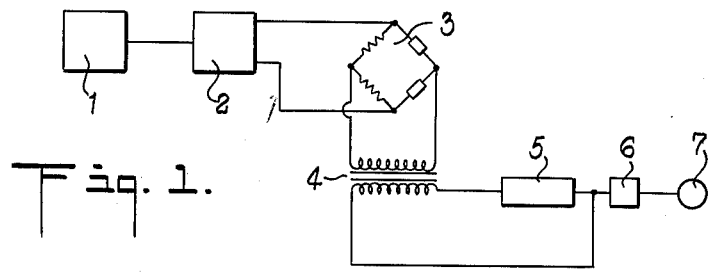

In Fig. 1 is the sketch of the circuits of the electrical apparatus.

Figure 2:
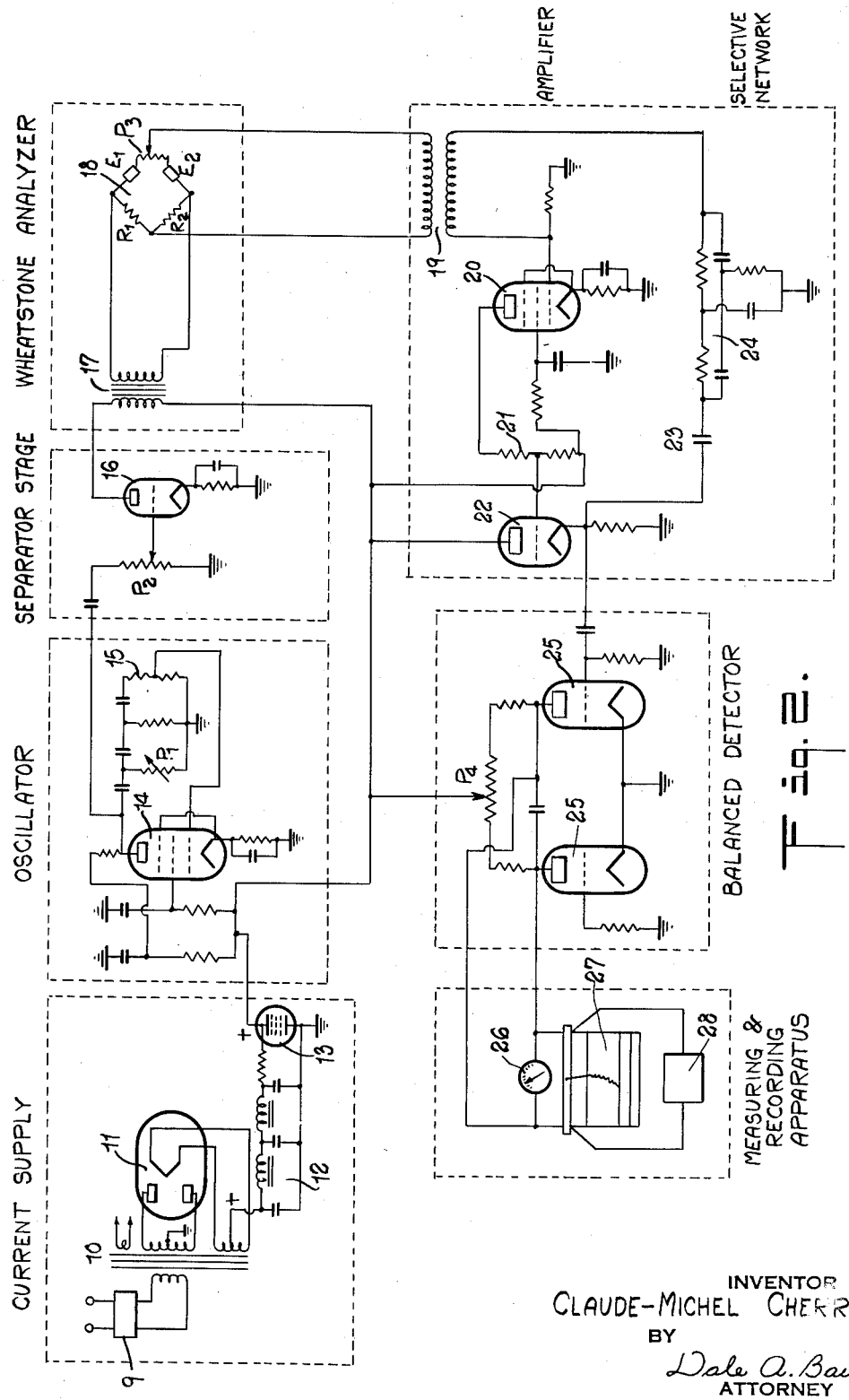

In Fig. 2 is a detailed view of a particular setting corresponding with the invention.

Figure 3:
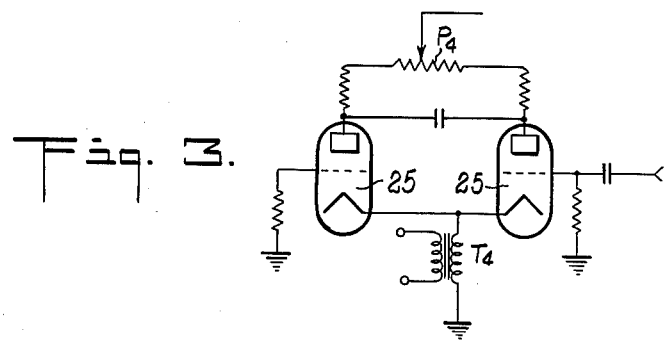

Fig. 3 presents a detailed arrangement of the detector.

Figure 4:
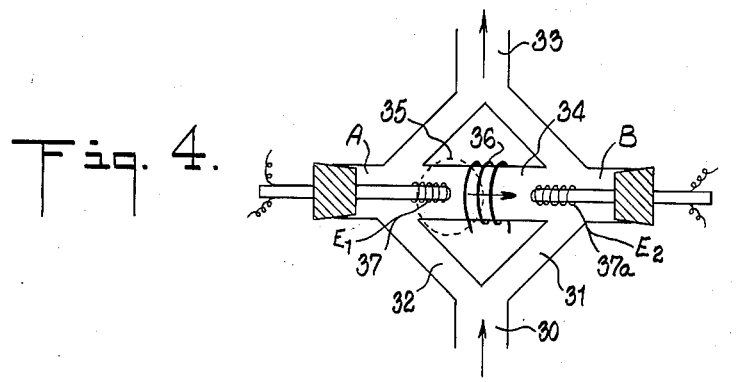

Fig. 4 shows the schematic arrangement of the apparatus in which the gas to be analyzed circulates in the neighborhood of the magnetic field.

From the electrical point of view, an essential characteristic of the apparatus resides in the fact that the Wheatstone bridge is fed with audio frequency. The electrical arrangement characteristic of the invention comprises, in its essentials, the following:

1. An oscillator which furnishes the chosen audio frequency;
2. A Wheatstone bridge supplied by the oscillator and of which the two arms are connected to electrical resistances of which the thermal balance is upset by the current of oxygen;
3. An amplifier;
4. A detector supplying the measuring apparatus and including a voltmeter, a registry apparatus, and possibly an alarm relay to be activated when the oxygen content in the mixture attains a value determined in advance.

In Fig. 1, 1 represents the oscillator; 2 represents a triode tube matching the impedances of the oscillator and the Wheatstone bridge 3. A transformer 4 raises the voltage connecting the Wheatstone bridge to the amplifier 5. A detector 6 is shown and the numeral 7 represents the measuring apparatus and its relays.

In Fig. 2 is shown the diagrammatic detail of the electrical circuits of the apparatus which is indicated schematically in Fig. 1.

In Fig. 2, 10 represents the power supply transformer of which the primary is connected to the AC supply by means of a voltage regulator 9 and the secondary is connected to a rectifying diode 11 followed by a filter of inductance capacity type and a discharge lamp (voltage regulating tube). The apparatus 10 to 13 constitutes the stabilized power supply for the oscillator.

The oscillator is of the phase-shift type and comprises a pentode acting as an oscillator, 14, and a tuned circuit 15 which contains no inductance and which has a high ability for regulation in consequence. A variable potentiometer $P_1$ serves for the setting of the frequency of the oscillator at the value desired.

The oscillator is followed by a separator stage including a triode 16 and a potentiometer $P_2$. The triode permits the matching of impedances between oscillator and the measuring bridge. The potentiometer sets up the amplitude of the sinusoidal wave emitted by the oscillator. The alternating current or voltage existing at the discharge of the separator is applied to the primary of transformer 17 of which the secondary is connected to the Wheatstone bridge 18. This bridge includes four resistances $E_1$, $E_2$, $R_1$ and $R_2$, of which resistances $E_1$ and $E_2$ are placed in the analyzing tube through which passes the screen of gas to be analyzed, as will be more fully explained hereinafter. A potentiometer $P_3$ allows one to balance the bridge and to locate the zero of the scale.

The Wheatstone bridge discharges to the primary of a transformer 19 of which the secondary is connected to the input of an amplifier of resistance coupled type. The amplifier includes an amplifying pentode 20 and a group of resistances 21. A part of the alternating voltage, having been amplified, and coming from the plate of this pentode is sent to the grid of a cathode follower triode of which the plate is connected to high tension. The cathode of this tube 22 follows the variations of the alternating electromotive force, and by means of an intermediate coupling by capacity 23 transmits them to a selective network 24 from whence they are sent to the input of the amplifier. The tube 22 supplies the selective network by a low impedance. The selective network 24 is composed of a group of resistance and capacities of double T design. A part of the alterating voltage collected at the amplifier output is reinjected across it to the input of the amplifier in series with the signal coming from the Wheatstone bridge. This network is constructed so as to stop the basic frequency of the oscillator (for example 1000 periods per second) and to permit the other frequencies to pass. There is thus introduced a negative feedback through all the range of frequencies except the fundamental frequency and this accomplishes a selective amplification of this basic frequency. In practice the width of the band may be reduced to about 10 periods (periods mean cycles per second).

At the discharge of the amplifier there is placed a balanced detector constituted by a double triode 25, the grid of the first element of which is capacitance-coupled to the discharge of the amplifier. This grid as well as the grid of the second element of the triode are grounded through a high resistance. The plates of the detector are connected to high tension by a potentiometer P4.

The measuring apparatus includes a volmeter 26, a register 27, and an alarm relay 28 which are mounted in parallel to each other and are connected to the plate circuit of the detector so as to record the difference in E. M. F. between the two plates. The potentiometer P4 allows the voltmeter to be set at zero when no signal is received by the detector.

In the modification of Fig. 3, the sensitivity of the apparatus is increased by phase selecting apparatus coupled to the detector. The detector 25 has cathodes not directly grounded, contrary to Fig. 2, but connected to the secondary of a low frequency transformer T4 of which the primary received a reference voltage from the oscillator.

The gas analyzer, comprised of the group of tubes which conduct the gas into the vicinity of a magnetic field, and utilize the secondary current of gas set up by that field to destroy the thermal balance of resistances $E_1$ and $E_2$ of the Wheatstone bridge, is schematically shown in Fig. 4. The analyzer proper comprises a tube 30 through which the gas enters into branch tubes 31, 32 which join again in discharge tube 33. A cross tube 34 connects the mid points of the branches. Near this tube a magnetic field is set up of which the zone of influence is in the space enclosed within the dotted line 35, which is off the center of tube 34. A heating resistance 36 encircles tube 34, centrally thereof. Two rods are admitted to the tube 34, at opposite sides, and electric resistance coils are supported on the rods. These are the resistances $E_1$, $E_2$ of Fig. 2, which form two arms of the bridge.

The apparatus works as follows: If the gas contains a paramagnetic component, such as oxygen, that component is partly driven by the magnetic field 35 from A to B. It engages the tube 34, which is heated by resistance 36, loses its magnetism and flows toward B. There is a constant flow of gas through tube 34 and this upsets the thermal equilibrium between the resistances 37 and 37a, lowering the temperature of the former and raising that of the latter. This unbalance is a function of the amount of oxygen in the gaseous mass, and it upsets the balance of the bridge by changing the ohmic resistance of resistances 37 and 37a.

The electrical circuits amplify and register the unbalance of the bridge and consequently show the concentration of the paramagnetic gas in the stream passing from tube 30 to 33.

Before making measurements, the tube 34 should be accurately levelled and the bridge should be put in precise equilibrium. After the oxygen appears in the gas current, the measuring voltmeter deviates, and, when that deviation becomes great enough, the alarm relay is activated. If the voltmeter is of permanent record type, the oxygen content can be continuously recorded.

The sensitivity of the apparatus depends on the power of the magnetic attraction exercised by the magnetic field. For example with a field of which the induction is about 4000 gauss, and an amplifier gaining 1000 for 1000 periods, one can obtain a deviation of 26 volts with an oxygen content of 4%. The range of concentration in which the oxygen content can be easily determined, with such an apparatus, is from 3–5%. When the content of oxygen is less, for instance .1–1% it is better to use a more powerful magnetic field, for example one having an induction of 10,000 gauss. It is always possible to add a supplementary stage of amplification if it is desired to increase the sensitivity of the apparatus.

Figure 5:
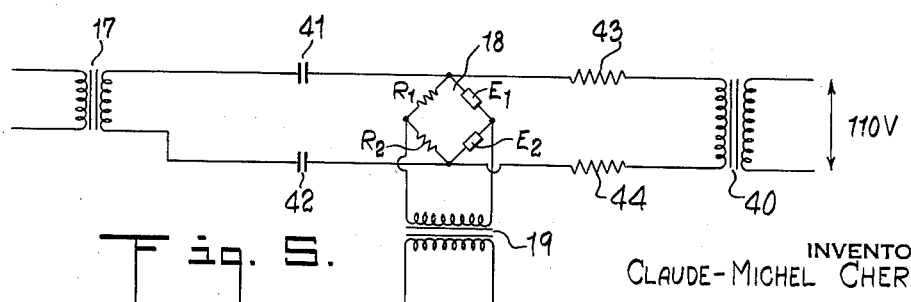

Fig. 5 is a diagram of a modification of Fig. 4.

In this form of the invention the heating resistance 36 is eliminated and the heating is accomplished by imposing on the audio frequencies moving in the resistances 37 and 37a, which effect the necessary measurement, a heating current of very low frequency, for instance 50 cycles per second. This current, which heats the two resistances alike, demagnetizes the oxygen, avoids the use of external heating means, increases the stability of the apparatus, and further equalizes the temperature obtained.

In practice, the arrangement of Fig. 5 is satisfactory for this purpose, wherein a transformer 17, the bridge 18, the resistances $R_1$, $R_2$, $E_1$ and $E_2$, and the primary of the transformer 19 are as in Fig. 2, but the secondary of transformer 40, of which the primary is connected to the local supply circuit, providing for example, 110 v. 50 cycles. To prevent the heating current from disturbing the operation of the bridge, condensers 41 and 42 are included to block the heating current from the oscillator. Similarly the audio frequency current is blocked from transformer 40, to prevent impairing the good operation of the apparatus, by the installation of filters 43, 44.

In another modification, it is possible to increase the sensitivity of the apparatus greatly by replacing the measuring resistances $E_1$ and $E_2$ (37, 37a) by thermistors, otherwise called resistances of which the conductivity increases rapidly with temperature rise, but in this case, a heating coil 36 should be employed about tube 34, as in Fig. 4, as a heating current cannot be superimposed on the measuring current in a thermistor.

As many apparently widely different embodiments of the present invention may be made without departing from the spirit and scope thereof, it is to be understood that the invention is not limited to the specific embodiments.

What is claimed is:

1. Gas analyzing apparatus comprising parallel gas conduits interconnected by a cross conduit, means to flow a gas through said parallel conduits, means generating a magnetic field in the cross conduit, audio frequency current supplied heating resistances disposed within the conduits near the ends of the cross conduit comprising arms of an electrical measuring bridge, and low frequency means to heat the gas flowing through the cross conduit.

2. In apparatus for the analysis of gases in which a Wheatstone bridge has arms comprising resistors in thermal equilibrium, a gas flow means enclosing each said resistor, gas flow means joining said gas flow means at the resistors, means to create a magnetic field at one end of said joining means, audio frequency current supplying means connected to and supplying the Wheatstone bridge and the said arms thereof, electric heating means acting upon the gas between the field and the other end of the joining means, and low frequency current supply means connected to and supplying the heating means.

3. Apparatus for the analysis of gases comprising an oscillator supplying audio frequency current, a Wheatstone bridge having arms connected to the oscillator comprising heat sensitive, balanced electrical resistance, first container means to hold a gas containing a paramagnetic component in contact with one said resistance, second container means to hold a gas in contact with the other of said resistances, means to flow a single gas into both said container means, gas conduit means connecting said container means, both resistances being located so that gas flowing through said conduit means must flow over said resistances, means to establish a magnetic field in the conduit near the said first container means, and means to heat the gas flowing from the magnetic field through the said conduit before it reaches the said second resistance.

4. Apparatus for the analysis of gas comprising an oscillator supplying audio frequency current of circa 1000 cycles per second to a Wheatstone bridge having balanced resistor arms at least one of which is heat sensitive, double conduit means to flow the gas to be analysed over said resistances, cross-conduit means connecting said conduit means at said resistances, magnetic means acting upon the gas in one of said double conduit means at the end of the cross-conduit opposite the said heat sensitive resistance, electric heating means of a frequency on the order of fifty cycles per second acting upon the gas between the ends of the cross-conduit, amplifier means connected to the output of the bridge and signal means connected to the amplifier.

5. The apparatus of claim 4 in which a separator stage connects the oscillator to the Wheatstone bridge and to an amplifier for the output of the bridge.

6. In apparatus for the analysis of gases in which a current measuring device is connected to two thermally sensitive resistors in thermal equilibrium, a source of current for said device and resistors of one frequency, means to flow the gas to be analyzed over the said resistors comprising tubes in parallel enclosing the resistors and connected by a cross tube at the resistors, means to separate a paramagnetic gas from the gas in one of said parallel tubes and flow it through the cross tube to the other parallel tube comprising means to generate a magnetic field acting on the gases in said one tube at the junction thereof with the cross tube, and electric means of frequency different from that in the resistors of the current measuring device, to heat the gas which passes through the cross tube after it leaves said field.

References Cited in the file of this patent

UNITED STATES PATENTS

| | | |
|---|---|---|
| 2,111,786 | Knight | Mar. 22, 1938 |
| 2,135,587 | Lovelady | Nov. 8, 1938 |
| 2,603,964 | Foley et al. | July 22, 1952 |
| 2,603,965 | Medlock | July 22, 1952 |
| 2,650,496 | Middleton et al. | Sept. 1, 1953 |

FOREIGN PATENTS

| | | |
|---|---|---|
| 742,690 | Germany | Dec. 9, 1943 |

OTHER REFERENCES

A Paramagnetic Oxygen Analyzer, Clarence A. Dyer, The Review of Scientific Instruments, vol. 18, No. 10, Oct. 1947.